United States Patent
Zhu

(10) Patent No.: US 7,713,661 B2
(45) Date of Patent: May 11, 2010

(54) NEGATIVE ELECTRODES FOR ZINC NICKEL SECONDARY BATTERIES AND THEIR FABRICATION METHODS

(75) Inventor: Zhijian Zhu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 550 days.

(21) Appl. No.: 11/336,259

(22) Filed: Jan. 20, 2006

(65) Prior Publication Data

US 2006/0172197 A1  Aug. 3, 2006

(30) Foreign Application Priority Data

Jan. 28, 2005  (CN)  ............ 2005 1 0002899

(51) Int. Cl.
*H01M 4/58* (2006.01)
*H01M 4/62* (2006.01)
*H01M 4/48* (2006.01)

(52) U.S. Cl. .......... 429/231.8; 429/217; 429/231

(58) Field of Classification Search ......... 429/231, 429/231.8, 232, 217
See application file for complete search history.

(56) References Cited

U.S. PATENT DOCUMENTS 3,497,387 A * 2/1970 Amiet .............. 429/206
4,400,452 A * 8/1983 Bruder ............ 429/152
5,460,899 A   10/1995 Charkey
7,052,629 B2 * 5/2006 Maeda et al. ...... 252/511

FOREIGN PATENT DOCUMENTS

CN   1501530 A    6/2004
JP   59033756   * 2/1984

* cited by examiner

*Primary Examiner*—Patrick Ryan
*Assistant Examiner*—Thomas H. Parsons
(74) *Attorney, Agent, or Firm*—Venture Pacific Law, PC

(57) ABSTRACT

The present invention relates to negative electrode for zinc nickel secondary batteries and the fabrication methods. These negative electrodes contain hydrophobic porous conductive granules such as carbon black granules with a hydrophobic material adsorbed. The fabrication methods for these negative electrodes include the following steps: adding a hydrophobic material to conductive porous granules such as granules in an aqueous solution; stirring the aqueous solution with the conductive porous granules and the hydrophobic material; fabricating the active material with the aqueous solution with the conductive porous granules and the hydrophobic material; and forming the negative electrode with the active material. Batteries with negative electrodes that are embodiments of this invention or are fabricated by the method of this invention are efficient in the recombination of oxygen at the electrodes during charging have low internal pressure, and are not subjected to electrolyte leakage.

17 Claims, No Drawings

NEGATIVE ELECTRODES FOR ZINC NICKEL SECONDARY BATTERIES AND THEIR FABRICATION METHODS

CROSS REFERENCE

This application claims priority from a Chinese patent application entitled "Zinc Negative Electrodes for Zinc-Nickel Secondary Batteries, Fabrication Methods for said Negative Electrodes, and Zinc-Nickel Secondary Batteries Containing said Negative Electrodes" filed on Jan. 28, 2005, having a Chinese Application No. 200510002899.1. This application is incorporated herein by reference in its entirety.

FIELD OF INVENTION

This invention relates to negative electrodes for zinc nickel secondary batteries and their fabrication methods. Particularly, it relates to materials for zinc negative electrodes for zinc nickel secondary batteries.

BACKGROUND

At the end of the charging process or when a battery is overcharged, oxygen is continuously released at the nickel positive electrode of a zinc nickel secondary battery. Oxygen recombination, the re-absorption of the oxygen released due to battery operation, occurs when the zinc oxidizes. It can also occur during the electrochemical reduction reaction at the surface of the negative electrode. In a conventional zinc-nickel secondary battery, the ability of the zinc negative electrode to recombine oxygen is poor. Therefore, at the end of the charging cycle or when the battery is overcharged, especially when the battery is charged with a high current, the oxygen generated cannot be adequately recombined at the zinc negative electrode. When the oxygen generation rate at the positive electrode exceeds the rate of oxygen recombination at the negative electrode, oxygen accumulation will cause the internal pressure of the battery to increase. This may result in the release of the safety valve and electrolyte leakage.

In some applications, the capacity for oxygen recombination has to be high as batteries are constantly subject to overcharging. For example, batteries in cordless telephones are generally charged whenever they are not in use. Therefore, the battery packs for these applications must be capable of withstanding overcharging without significant increase in internal pressure that may result in electrolyte leakage, erosion of the circuitry, and subsequent damage to the equipment.

There are two approaches to reducing the internal pressure of a battery. One is to decrease the oxygen generation during overcharging by increasing the over-potential for the oxygen evolution. The second is to increase the recombination of the oxygen at the zinc negative electrode.

In prior art, such as that disclosed in the Chinese Patent CN1501530A, to improve electrical conductivity, electrically conductive additives such as carbon black and graphite are added to the active material for the negative electrode. To improve the capacity for oxygen recombination for the zinc negative electrode, hydrophobic binding agent such as polytetrafluoroethylene (PTFE) are used to form a hydrophobic network, that, to a limited extent, creates pores within the negative electrode. These pores form pathways for the oxygen to enter into the electrode where additional oxygen recombination can occur at the internal surfaces of the pores.

However, this method is insufficient to adequately control the increase in internal pressure during overcharging as both the hydrophilic zinc oxide and the carbon black granules that have a large pore volume are highly liquid-absorbent. The customary process for fabricating zinc negative electrodes uses aqueous solutions. When zinc oxide, carbon black, metal oxide additives, and hydrophilic binding agents are stirred and mixed to form a paste during fabrication, the pores in the carbon black adsorb the hydrophilic binding agents such that the electrolyte fills the pores of the carbon black when it is injected into the battery. The filled carbon black pores cannot be utilized to facilitate oxygen recombination. Moreover, the electrolyte in the pores blocks and prevents oxygen from entering into the electrode to recombine.

Currently, to improve oxygen recombination at the zinc negative electrode, a split stacked negative electrode assembly design such as that described in U.S. Pat. No. 5,460,899 is widely used. In that design, an integrated negative electrode is formed with a porous hydrophobic membrane that separates two zinc electrode half-plates. The oxygen generated in the charging process can reach and recombine inside the zinc electrode half-plate through the porous hydrophobic membrane. Therefore, this hydrophobic membrane effectively doubles the area of the interface between the oxygen and the zinc negative electrode.

However, there are many disadvantages to this design as well. The use of two zinc electrode half-plates doubles the quantity of current collector needed and increases the cost of raw materials. Moreover, the process for fabricating an integrated zinc negative electrode is complicated and the labor costs for its fabrication are increased. In addition, this design is only suitable for laminated battery structures, usually for rectangular batteries. They are not suitable for winding type battery structures, usually for cylindrical batteries.

Due to the limitations of the prior art, it is therefore desirable to have novel negative electrodes and novel methods for fabricating negative electrodes that are low in labor and production costs, that is applicable for use in different battery designs, and that allow for increase oxygen recombination.

SUMMARY OF INVENTION

An object of this invention is to provide negative electrodes for zinc nickel secondary batteries and fabrication methods for these negative electrodes such that batteries with said electrodes are efficient in oxygen recombination at these negative electrodes during charging.

Another object of this invention is to provide negative electrodes for zinc nickel secondary batteries and methods for fabricating these negative electrodes such that batteries with said negative electrodes have low internal pressure during operation.

Another object of this invention is to provide negative electrodes for zinc nickel secondary batteries and methods for fabricating these negative electrodes such that batteries with said negative electrodes can withstand overcharging and are not vulnerable to electrolyte leakages.

Another object of this invention is to provide negative electrodes for zinc nickel secondary batteries and fabrication methods for the negative electrodes that are inexpensive to produce.

Briefly, the present invention discloses negative electrode for zinc nickel secondary batteries and the fabrication methods. These negative electrodes contain hydrophobic porous conductive granules such as carbon black granules with a hydrophobic material adsorbed. The fabrication methods for these negative electrodes include the following steps: adding a hydrophobic material to conductive porous granules such as granules in an aqueous solution; stirring said aqueous solution with said conductive porous granules and said hydrophobic material; fabricating the active material with said aqueous solution with said conductive porous granules and said hydrophobic material; and forming said negative electrode with said active material.

An advantage of this invention is that the negative electrodes of this invention or negative electrodes fabricated by the methods of this invention such that a batteries with these negative electrodes are efficient in the recombination of oxygen at the electrodes during charging.

Another advantage of this invention is that batteries with the negative electrodes of this invention or negative electrodes fabricated by the methods of this invention have low internal pressure during operation.

Another advantage of this invention is that batteries with the negative electrodes of this invention or negative electrodes fabricated by the methods of this invention can withstand overcharging and are not vulnerable to electrolyte leakages.

Another advantage of this invention is that the negative electrodes of this invention or negative electrodes fabricated by the methods of this invention are inexpensive to fabricate.

DETAILED DESCRIPTION OF THE PREFERRED EMBODIMENTS

The presently preferred embodiments of this invention are negative electrodes and methods for fabricating these negative electrodes for zinc nickel secondary batteries that have active material that contain conductive hydrophobic porous granules. The granules can be distributed, preferably uniformly, both on the surface and within the negative electrode. These granules function as electrical conductors. Their pores facilitate the recombination of oxygen inside the negative electrode. In addition, they also provide pathways for the transmission oxygen from the surface to deep within the electrode, enabling oxygen recombination not only at the surface but also deep within. Preferably, the pores of these granules that form the pathways are small but have a large real surface area. In the optimal situation, the pores are evenly distributed inside and on the surface of a zinc negative electrode and they enhance the efficiency of oxygen recombination throughout the zinc negative electrode, thus reducing the internal pressure of the battery, and significantly improving the ability of the battery to withstand over-charging without causing electrolyte leakage, or circuit board erosion. In addition, the cost for production for batteries containing said embodiments can be reduced by one third. A battery pack containing said preferred embodiments will only need two battery units instead of the three-battery unit packs that are currently on the market for applications such as cordless phones.

In the preferred embodiments, the conductive porous hydrophobic granules can be conductive porous granules with a hydrophobic material adsorbed. This hydrophobic material can be polytetrafluoroethylene or butylbenzene rubber.

Carbon black granules are an example of conductive porous granules that are used in the preferred embodiments. Preferably, the carbon black has a total specific pore volume of between 0.45 $cm^3$/g and 0.80 $cm^3$/g, a BET specific surface area of between 200 $m^2$/g and 1600 $m^2$/g, and an average granule size of between 25 μm and 50 μm.

The active material for said negative electrode can also contain materials that are commonly found in zinc nickel negative electrodes such as oxides of zinc and binding agents. For embodiments that contain carbon granules adsorbed with a hydrophobic material, the weight percentages for the ingredients of said negative electrode active material can be:

zinc oxide: between 86% and 95%;
binding agent: between 1% and 8%;
carbon black: between 0.2% and 5%; and
hydrophobic materials adsorbed to the carbon black: between 0.02% and 1%.

Said binding agent or agents can be any binding agent that is generally used for zinc negative electrodes. For example, said binding agent can be a mixture of a hydrophobic binding agent and a hydrophilic binding agent. For the embodiments, there are no limitations on the weight ratio of the hydrophilic binding agent to the hydrophobic binding agent. The ratio can be determined based on need. For example, the weight ratio of the hydrophilic binding agent and the hydrophobic binding agent can be (between 0.3 and 1):1. Said hydrophobic binding agent can be polytetrafluoroethylene or butylbenzene rubber, or a mixture of both. Said hydrophilic binding agent can be one or more of the following: hydroxyl propyl methyl cellulose, sodium carboxy methyl cellulose, hydroxyethyl cellulose, and polyvinyl alcohol.

The active material for the negative electrode can also contain metal oxide additives. Said metal oxide additive can be one or more of the following: cadmium oxide, bismuth oxide, indium oxide, lead oxide, and oxides of stannum or tin. Said metal oxide additive can constitute up to 15 wt. % of the total weight of the active material for the negative electrode. Preferably, the negative electrode contains between 1 wt. % to 12 wt. % of metal oxide additives. The metal oxide additives prevent the premature passivation of the battery due to overpolarization during discharge. During the initial charging, the metal oxide additives are converted to its metal form before ZnO does to form a conductive network. These metal oxide additives do not participate in the chemical reaction during a discharge. Therefore, the metal conductive matrix is preserved, the polarization of the negative electrode is diminished, and the passivation is delayed, enabling the batteries to discharge more electricity.

Negative electrodes that are the embodiments of the present invention comprise a current collector and active materials for said negative electrodes that include above stated conductive porous hydrophobic granules coating the current collector.

The preferred methods for fabricating the negative electrodes of this invention include the steps of:

dispersing conductive porous granules in an aqueous solution;

adding a hydrophobic material to said conductive porous granules in said aqueous solution;

stirring said aqueous solution with said conductive porous granules and said hydrophobic material such that the hydrophobic material is adsorbed to said carbon black granules;

fabricating the active material with said aqueous solution with said conductive porous granules and said hydrophobic material; and forming said negative electrode with said active material.

The hydrophobic material can be polytetrafluoroethylene or butylbenzene rubber. The concentration of the suspension of the hydrophobic material used to form said conductive porous hydrophobic granules does not have a great effect on the adsorption of the conductive porous granules such as carbon black. Therefore, there is no specific limitation on the concentration for the hydrophobic material. It can be adjusted according to the needs of operation. For example, it can be between 10 wt. % and 60 wt. %.

Carbon black granules are an example of conductive porous granules that are used in preferred embodiments. Preferably, the carbon black has a total specific pore volume of between 0.45 cm$^3$/g and 0.80 cm$^3$/g, a BET specific surface area of between 200 m$^2$/g and 1600 m$^2$/g, and an average granule size of between 25 µm and 50 µm.

The steps of fabricating of said active material for the negative electrodes include the addition of other ingredients for the active materials. These are ingredients that are commonly found in the active materials for negative materials for zinc nickel batteries. Examples of ingredients and the quantities that can be used are discussed above.

Negative electrodes can be formed by coating the active materials for said negative electrodes that include above stated conductive porous hydrophobic granules on a current conductor.

An example of such a method includes:

dispersing 0.2 to 5 weight units of carbon black in 25 to 35 weight units of water;

adding a water suspension formed with 0.02 to 1 weight units of hydrophobic material;

stirring until said hydrophobic material is completely adsorbed or adsorbed to the carbon black to obtain the conductive porous hydrophobic carbon black granules;

adding 86 to 95 weight units of zinc oxide, and if needed, 1 to 12 weight units of metal oxide additive to the conductive hydrophobic porous granules;

while stirring, adding a dry weight of 0.3 to 3 weight units of hydrophilic binding agent solution;

adding and stirring a dry weight of 0.7 to 5 weight units of a hydrophobic binding agent solution to obtaining a uniform zinc negative electrode paste;

using a paste stretching equipment to coating the two sides of the electrode current collector with said zinc negative electrode paste;

drying it with heat; and stamping the current collector to fabricate the zinc negative electrode according to specific size requirements.

The concentration of the suspension of the hydrophobic material used to form said conductive porous hydrophobic granules does not have a great effect on the adsorption of the conductive porous granules such as carbon black. Therefore, there is no specific limitation on the concentration for the hydrophobic materials. For example, it can be between 10 wt. % and 80 wt. %.

There is no specific limitation on the concentration of the hydrophilic binding agent solution or the hydrophobic binding agent used. The concentration of these binding agents can be flexibly adjusted according to the requirements for viscosity and operability of the stretched paste. For example, the concentration of said hydrophilic binding agent solution can be between 0.5 wt. % and 4 wt. %, and the concentration of said hydrophobic binding agent solution can be between 10 wt. % and 80 wt. %.

A zinc-nickel secondary battery fabricated using zinc negative electrodes that are embodiments of this invention or are fabricated with the methods of this invention can also contain a nickel positive electrode, a separator layer, and an alkaline electrolyte. The negative electrode comprises current collector coated with the active materials for the negative material that are embodiments of this invention.

There is no special limitation on the positive electrode, separator, or electrolyte. All types of nickel positive electrodes, separators, and alkaline electrolytes commonly used in zinc nickel secondary batteries can be used. For example, said nickel positive electrode can be fabricated with the following steps: mixing and stirring spherical nickel hydroxide, cobaltous oxide, conductive carbon black and suspension of PTFE and aqueous solution of hydroxyl propyl methyl cellulose and de-ionized water to create a paste; coating the paste onto a nickel foam; welding conduction tabs to said nickel form; drying with heat; rolling; and trimming to obtain a positive electrode. The separator can be a composite separator of modified polypropylene felt, vinylon felt, or nylon felt being welded or bound to a wettable polyolefin micro-pored membrane. The alkaline electrolyte can be an aqueous solution containing at least one of the following: KOH, NaOH, and LiOH.

The following embodiments further describe this invention.

Embodiment 1

The method for fabricating the conductive porous hydrophobic granules of the active materials for the negative electrode of this embodiment includes the following steps:

adding 25 g of de-ionized water to 0.2 g of carbon black (product of China Rubber Group of the Carbon Black Industrial Research Institute) with a specific pore volume of 0.5 cm$^3$/g, a BET specific surface area of 300m$^2$/g, and an average granule diameter of 25 µm in a beaker;

stirring and mixing the contents in the beaker using a stir mixer;

while mixing, adding 0.03 g of 60% concentration polytetrafluoroethylene (PTFE) aqueous suspension solution to the contents in said beaker;

continue stirring and mixing the contents for ten minutes;

obtaining the porous hydrophobic carbon black granules when the turbidity of the supernate has disappeared and the supernate is completely clear. This indicates that the hydrophobic polytetrafluoroethylene has been completely adsorbed to the carbon black granules. If the supernate in the beaker is still not completely clear, the final stirring and mixing step can be repeated until the supernate is completely clear.

The method for fabricating the negative electrode of the zinc nickel battery of this embodiment includes the following steps:

mixing 86 g of zinc oxide, 5 g of cadmium oxide, and 5 g of bismuth oxide uniformly;

adding the mixture to the contents in the beaker containing the fabricated porous hydrophobic conductive granules;

adding and mixing uniformly 10 g of a 3% concentration of hydroxypropyl methyl cellulose aqueous solution and 12 g of a 4% concentration of polyvinyl alcohol aqueous solution to the contents in the beaker;

adding 2.5 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

The positive electrode of the zinc nickel secondary battery of this embodiment includes the following steps:

mixing and stirring 92 g of spherical nickel hydroxide, 7 g of cobaltous oxide, 11 g of carbon black, and a binding agent solution with 4 g of polytetrafluoroethylene, 0.2 g of hydroxyl propyl methyl cellulose and 40 g of de-ionized water to form a paste;

spreading the paste on a piece of nickel foam welded to a current guiding tab;

drying with heat;

roll pressing; and cutting to form the nickel positive electrode with a length of 70 mm and a width of 19 mm.

The method for fabricating the zinc nickel secondary battery of this embodiment includes the following steps:

fabricating a composite separator by welding or binding a modified polypropylene felt to a wettable polyolefine micropore membrane;

separating the zinc negative electrode and nickel positive electrode of this embodiment with said composite separator;

forming an electrode core by winding the negative electrode, the composite separator, and the positive electrode using a winding machine;

placing said electrode core in a steel container of a model 2/3AA battery;

spot welding and groove pressing;

injecting an electrolyte containing 25% of KOH and 1.5% of LiOH; and sealing said battery to obtain a model 2/3AA cylindrical zinc-nickel battery.

Embodiment 2

The method for fabricating the conductive porous hydrophobic granules of the active materials for the negative electrode of this embodiment includes the following steps:

adding 25 g of de-ionized water to 0.2 g of carbon black (product of China Rubber Group of the Carbon Black Industrial Research Institute) with a specific pore volume of 0.55 $cm^3/g$, a BET specific surface area of 400 $m^2/g$, and an average granule diameter of 30 μm in a beaker;

stirring and mixing the contents in the beaker using a stir mixer;

while mixing, adding 0.1 g of 60% concentration polytetrafluoroethylene (PTFE) aqueous suspension solution to the contents in said beaker;

continue stirring and mixing the contents for ten minutes;

obtaining the porous hydrophobic carbon black granules when the turbidity of the supernate has disappeared and the supernate is completely clear. This indicates that the hydrophobic polytetrafluoroethylene has been completely adsorbed to the carbon black granules. If the supernate in the beaker is still not completely clear, the stirring and mixing step can be repeated until the supernate is completely clear.

The method for fabricating the negative electrode of the zinc nickel battery of this embodiment includes the following steps:

mixing 87 g of zinc oxide, 4 g of indium oxide, and 6 g of bismuth oxide uniformly;

adding the mixture to the contents in the beaker containing the fabricated porous hydrophobic conductive granules;

adding and mixing uniformly 10 g of a 3% concentration of hydroxyethyl cellulose aqueous solution and 12 g of a 4% concentration of polyvinyl alcohol aqueous solution to the contents in the beaker;

adding 2.5 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

Using the zinc negative electrode of this embodiment, a model 2/3AA cylindrical zinc nickel secondary battery of this embodiment of the present invention is fabricated using the same method and same positive electrode as described in Embodiment 1.

Embodiment 3

The method for fabricating the conductive porous hydrophobic granules of the active materials for the negative electrode of this embodiment includes the following steps:

adding 27 g of de-ionized water to 1.0 g of carbon black (product of Ketjen Black International Company) with a specific pore volume of 0.65 $cm^3/g$, a BET specific surface area of 800 $m^2/g$, and an average granule diameter of 45 μm in a beaker;

stirring and mixing the contents in the beaker using a stir mixer;

while mixing, adding 0.6 g of a 60% concentration of butylbenzene rubber (SBR) aqueous suspension solution (product of Nangtong Shen Hua Chemical Industrial Company Limited, model TAIPOL1500E) to the contents in said beaker;

continue stirring and mixing the contents for ten minutes;

obtaining the porous hydrophobic carbon black granules when the turbidity of the supernate has disappeared and the supernate is completely clear. This indicates that the hydrophobic polytetrafluoroethylene has been completely adsorbed to the carbon black granules. If the supernate in the beaker is still not completely clear, the stirring and mixing step can be repeated until the supernate is completely clear.

The method for fabricating the negative electrode of the zinc nickel battery of this embodiment includes the following steps:

mixing 89 g of zinc oxide, 6 g of cadmium oxide, and 3 g of bismuth oxide uniformly;

adding the mixture to the contents in the beaker containing the fabricated porous hydrophobic conductive granules;

adding and mixing uniformly 10 g of a 3% concentration of hydroxypropyl methyl cellulose aqueous solution and 12 g of a 4% concentration of polyvinyl alcohol aqueous solution to the contents in the beaker;

adding 2.5 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

Using the zinc negative electrode of this embodiment, a model 2/3AA cylindrical zinc nickel secondary battery of this embodiment of the present invention is fabricated using the same method and same positive electrode described in Embodiment 1.

Embodiment 4

The method for fabricating the conductive porous hydrophobic granules of the active materials for the negative electrode of this embodiment includes the following steps:

adding 27 g of de-ionized water to 2.5 g of carbon black (product of Ketjen Black International Company) with a specific pore volume of 0.75 $cm^3/g$, a BET specific surface area of 1400 $m^2/g$, and an average granule diameter of 25 μm in a beaker;

stirring and mixing the contents in the beaker using a stir mixer;

while mixing, adding 1.25 g of 60% concentration of polytetrafluoroethylene aqueous suspension solution to the contents in said beaker;

continue stirring and mixing the contents for ten minutes;

obtaining the porous hydrophobic carbon black granules when the turbidity of the supernate has disappeared and the supernate is completely clear. This indicates that the hydrophobic polytetrafluoroethylene has been completely adsorbed to the carbon black granules. If the supernate in the beaker is still not completely clear, the stirring and mixing step can be repeated until the supernate is completely clear.

The method for fabricating the negative electrode of the zinc nickel battery of this embodiment includes the following steps:

mixing 89 g of zinc oxide, 4 g of cadmium oxide, and 3 g of lead oxide uniformly;

adding the mixture to the contents in the beaker containing the fabricated porous hydrophobic conductive granules;

adding and mixing uniformly 10 g of a 3% concentration of hydroxyethyl cellulose aqueous solution and 12 g of a 4% concentration of polyvinyl alcohol aqueous solution to the contents in the beaker;

adding 2.5 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

Using the zinc negative electrode of this embodiment, a model 2/3AA cylindrical zinc nickel battery secondary battery of this embodiment of the present invention is fabricated using the same method and same positive electrode described in Embodiment 1.

Embodiment 5

The method for fabricating the conductive porous hydrophobic granules of the active materials for the negative electrode of this embodiment includes the following steps:

adding 30 g of de-ionized water to 2.8 g of carbon black (product of Ketjen Black International Company) with a specific pore volume of 0.7 cm$^3$/g, a BET specific surface area of 1000 m$^2$/g, and an average granule diameter of 35 µm in a beaker;

stirring and mixing the contents in the beaker using a stir mixer;

while mixing, adding 1.87 g of 60% concentration of polytetrafluoroethylene aqueous suspension solution to the contents in said beaker;

continue stirring and mixing the contents for ten minutes;

obtaining the porous hydrophobic carbon black granules when the turbidity of the supernate has disappeared and the supernate is completely clear. This indicates that the hydrophobic polytetrafluoroethylene has been completely adsorbed to the carbon black granules. If the supernate in the beaker is still not completely clear, the stirring and mixing step can be repeated until the supernate is completely clear.

The method for fabricating the negative electrode of the zinc nickel battery of this embodiment includes the following steps:

mixing 90 g of zinc oxide, 4 g of cadmium oxide, and 3 g of stannum dioxide uniformly;

adding the mixture to the contents in the beaker containing the fabricated porous hydrophobic conductive granules;

adding and mixing uniformly 10 g of a 3% concentration of hydroxypropyl methyl cellulose aqueous solution and 12 g of a 4% concentration of polyvinyl alcohol aqueous solution to the contents in the beaker;

adding 2.5 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

Using the zinc negative electrode of this embodiment, a model 2/3AA cylindrical zinc nickel secondary battery of this embodiment of the present invention is fabricated using the same method and same positive electrode described in Embodiment 1.

Embodiment 6

The method for fabricating the conductive porous hydrophobic granules of the active materials for the negative electrode of this embodiment includes the following steps:

adding 31 g of de-ionized water to 1.5 g of carbon black (product of Ketjen Black International Company) with a specific pore volume of 0.55 cm$^3$/g, a BET specific surface area of 900 m$^2$/g, and an average granule diameter of 45 µm in a beaker;

stirring and mixing the contents in the beaker using a stir mixer;

while mixing, adding 0.17 g of 60% concentration of polytetrafluoroethylene aqueous suspension solution to the contents in said beaker;

continue stirring and mixing the contents for ten minutes;

obtaining the porous hydrophobic carbon black granules when the turbidity of the supernate has disappeared and the supernate is completely clear. This indicates that the hydrophobic polytetrafluoroethylene has been completely adsorbed to the carbon black granules. If the supernate in the beaker is still not completely clear, the stirring and mixing step can be repeated until the supernate is completely clear.

The method for fabricating the negative electrode of the zinc nickel battery of this embodiment includes the following steps:

mixing 91 g of zinc oxide, 3 g of cadmium oxide, and 3 g of bismuth oxide uniformly;

adding the mixture to the contents in the beaker containing the fabricated porous hydrophobic conductive granules;

adding and mixing uniformly 10 g of a 3% concentration of hydroxypropyl methyl cellulose aqueous solution and 12 g of a 4% concentration of polyvinyl alcohol aqueous solution to the contents in the beaker;

adding 2.5 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

Using the zinc negative electrode of this embodiment, a model 2/3AA cylindrical zinc nickel secondary battery of this embodiment of the present invention is fabricated using the same method and same positive electrode described in Embodiment 1.

Embodiment 7

The method for fabricating the conductive porous hydrophobic granules of the active materials for the negative electrode of this embodiment includes the following steps:

adding 33 g of de-ionized water to 0.7 g of carbon black (product of China Rubber Group of the Carbon Black Industrial Research Institute) with a specific pore volume of 0.6 $cm^3/g$, a BET specific surface area of 700 $m^2/g$, and an average granule diameter of 40 μm in a beaker;

stirring and mixing the contents in the beaker using a stir mixer;

while mixing, adding 0.25 g of 60% concentration polytetrafluoroethylene (PTFE) aqueous suspension solution to the contents in said beaker;

continue stirring and mixing the contents for ten minutes;

obtaining the porous hydrophobic carbon black granules when the turbidity of the supernate has disappeared and the supernate is completely clear. This indicates that the hydrophobic polytetrafluoroethylene has been completely adsorbed to the carbon black granules. If the supernate in the beaker is still not completely clear, the stirring and mixing step can be repeated until the supernate is completely clear.

The method for fabricating the negative electrode of the zinc nickel battery of this embodiment includes the following steps:

mixing 93 g of zinc oxide, 2.5 g of cadmium oxide, and 2.5 g of bismuth oxide uniformly;

adding the mixture to the contents in the beaker containing the fabricated porous hydrophobic conductive granules;

adding and mixing uniformly 10 g of a 3% concentration of hydroxypropyl methyl cellulose aqueous solution and 12 g of a 4% concentration of polyvinyl alcohol aqueous solution to the contents in the beaker;

adding 2.5 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

Using the zinc negative electrode of this embodiment, a model 2/3AA cylindrical zinc nickel secondary battery of this embodiment of the present invention is fabricated using the same method and same positive electrode described in Embodiment 1.

Embodiment 8

The method for fabricating the conductive porous hydrophobic granules of the active materials for the negative electrode of this embodiment includes the following steps:

adding 35 g of de-ionized water to 2.0 g of carbon black (product of Ketjen Black International Company) with a specific pore volume of 0.5 $cm^3/g$, a BET specific surface area of 500 $m^2/g$, and an average granule diameter of 25 μm in a beaker;

stirring and mixing the contents in the beaker using a stir mixer;

while mixing, adding 1.3 g of 60% concentration of polytetrafluoroethylene aqueous suspension solution to the contents in said beaker;

continue stirring and mixing the contents for ten minutes;

obtaining the porous hydrophobic carbon black granules when the turbidity of the supernate has disappeared and the supernate is completely clear. This indicates that the hydrophobic polytetrafluoroethylene has been completely adsorbed to the carbon black granules. If the supernate in the beaker is still not completely clear, the stirring and mixing step can be repeated until the supernate is completely clear.

The method for fabricating the negative electrode of the zinc nickel battery of this embodiment includes the following steps:

mixing 95 g of zinc oxide, 2.5 g of cadmium oxide, and 2.5 g of bismuth oxide uniformly;

adding the mixture to the contents in the beaker containing the fabricated porous hydrophobic conductive granules;

adding and mixing uniformly 10 g of a 3% concentration of hydroxypropyl methyl cellulose aqueous solution and 12 g of a 4% concentration of polyvinyl alcohol aqueous solution to the contents in the beaker;

adding 2.5 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

Using the zinc negative electrode of this embodiment, a model 2/3AA cylindrical zinc nickel secondary battery of this embodiment of the present invention is fabricated using the same method and same positive electrode described in Embodiment 1.

Comparison Example 1

The method for fabricating the negative electrode of the zinc nickel battery of this comparison example includes the following steps:

mixing 89 g of zinc oxide, 6 g of cadmium oxide, 3 g of bismuth oxide, and 1 g of the same carbon black that was used in Embodiment 3 uniformly in a beaker;

adding and mixing uniformly 10 g of a 3% concentration of hydroxypropyl methyl cellulose aqueous solution, 12 g of a 4% concentration of polyvinyl alcohol aqueous solution, and 30 g of de-ionized water to the contents in the beaker to obtain a uniformly mixed paste;

adding 3.1 g of a 60% concentration of polytetrafluoroethylene aqueous suspension solution to the contents in the beaker;

stirring and mixing the contents of the beaker to obtain an uniformly mixed paste;

spreading the paste on both sides of a mesh copper belt plated with tin;

drying said copper tape; and press cutting said copper tape to obtain the zinc negative electrode that is 99 mm×21.5 mm.

Using the zinc negative electrode of this comparison example, a model 2/3AA cylindrical zinc nickel secondary battery of this comparison example is fabricated using the same method and same positive electrode described in Embodiment 1.

Testing of Battery Properties

The testing of the properties of the batteries from the above-describe embodiments and comparison example are tested as follows:
- initially charging each battery for 16 hours with 30 mA;
- setting each battery aside for 5 hours;
- discharging each battery with 60 mA to 1.5V;
- recording the discharge capacity;
- weighing each battery;
- charging each battery continuously for 28 days with 30 mA;
- setting each aside for 1 to 4 hours;
- discharging each battery with 75 mA to 1.5V;
- recording the discharged capacity;
- weighing each battery; and
- testing the cycle life of each battery using the cycle life testing method of the IEC standard (IEC60285-1999).

The results of the testing are listed in Table 1.

TABLE 1

Properties of Model 2/3AA sealed zinc-nickel battery property
(30 mA charged for 28 days, 75 mA discharged to 1.5 V)

| Battery | Weight of Carbon Black (g) | Hydrophobic Material | Weight of Hydrophobic Material (g) | Battery Capacity (mAh) | Charging Time (d) | Rate of Capacity Preservation (%) | Loss of Mass (mg) | Life-span (cycles) |
|---|---|---|---|---|---|---|---|---|
| Embodiment 1 | 0.2 | PTFE | 0.03 | 362 | 28 | 80.5 | 9 | 450 |
| Embodiment 2 | 0.2 | PTFE | 0.1 | 354 | 28 | 83.3 | 4 | ≧500 |
| Embodiment 3 | 1 | SBR | 0.6 | 334 | 28 | 89.5 | 0 | ≧500 |
| Embodiment 4 | 2.5 | PTFE | 1.25 | 295 | 28 | 89.7 | 0 | ≧500 |
| Embodiment 5 | 2.8 | PTFE | 1.87 | 283 | 28 | 90.2 | 0 | ≧500 |
| Embodiment 6 | 1.5 | PTFE | 0.17 | 351 | 28 | 81.3 | 13 | 440 |
| Embodiment 7 | 0.7 | PTFE | 0.25 | 346 | 28 | 85.7 | 0 | ≧500 |
| Embodiment 8 | 2.0 | PTFE | 1.3 | 324 | 28 | 87.5 | 0 | ≧500 |
| Comparison Example 1 | 1 | | | 367 | 28 | 78.8 | 27 | 370 |

Table 1 shows that batteries that are embodiments of this invention loses relatively little or no mass after long term overcharging. The zinc negative electrodes of the above described embodiments have conductive porous granules that are hydrophobic. These granules can reduce the frequency or completely avoid the opening of the safety valve and the resultant leakage of electrolyte from the build up of excessive internal pressure. The quantity of the conductive porous granules that are hydrophobic, the relative quantities of carbon black and the hydrophobic material (such as polytetrafluoroethylene) in the electrically conductive granules affects a battery's initial capacity and its cycle life. A battery can achieve optimal overall properties by selecting these parameters within the optimal range.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

I claim:

1. A negative electrode for zinc nickel secondary batteries wherein the active material for said negative electrode comprises hydrophobic porous conductive granules, wherein such hydrophobic porous conductive granules further comprise of carbon black granules with a hydrophobic material adsorbed into the carbon black granules, wherein said carbon black granules are between 0.2 wt. % and 5 wt. % of the weight of said active material for said negative electrode, and wherein said hydrophobic material comprises butylbenzene.

2. The negative electrode of claim 1 wherein said active material also comprising oxides of zinc and binding agents wherein said oxides of zinc are between 86% and 95% of said active material and said binding agents are between 1 wt. % and 8 wt. % of the weight of said active material.

3. The negative electrode of claim 1 wherein said hydrophobic material is between 0.02 wt. % and 1 wt. % of the weight of said active material for said negative electrode.

4. The negative electrode of claim 3 wherein said hydrophobic material further comprises polytetrafluoroethylene.

5. The negative electrode of claim 1 wherein said hydrophobic material further comprises polytetrafluoroethylene.

6. The negative electrode of claim 1 wherein the specific pore volume of said carbon black granules is between 0.45 cm$^3$/g and 0.80 cm$^3$/g.

7. The negative electrode of claim 1 wherein the specific surface area of said carbon black granules is between 200 m$^2$/g and 1600 m$^2$/g.

8. The negative electrode of claim 1 wherein the average granule diameter of said carbon black granules is between 25 μm and 50 μm.

9. The negative electrode of claim 1 wherein
   the specific pore volume of said carbon black granules is between 0.45 cm$^3$/g and 0.80 cm$^3$/g;
   the specific surface area of said carbon black granules is between 200 m$^2$/g and 1600 m$^2$/g;
   the average granule diameter of said carbon black granules is between 25 μm and 50 μm;
   said hydrophobic material further comprises polytetrafluoroethylene; and
   said hydrophobic material is between 0.02 wt. % and 1 wt. % of the weight of said active material for said negative electrode.

10. A method for fabricating negative electrodes for zinc nickel secondary batteries comprising the steps of:

adding a hydrophobic material to conductive porous granules in an aqueous solution, wherein said conductive porous granules comprise carbon black granules, wherein said carbon black granules are between 0.2 wt. % and 5 wt. % of the weight of said active material for said negative electrode, and wherein said hydrophobic material comprises butylbenzene, and wherein said hydrophobic material is adsorbed into the carbon black granules;

stirring said aqueous solution with said conductive porous granules and said hydrophobic material;

fabricating an active material for said negative electrode using said conductive porous granules in said aqueous solution and said hydrophobic material; and forming said negative electrode with said active material.

11. The method for fabricating negative electrodes of claim 10 wherein said hydrophobic material is between 0.02 wt. % and 1 wt. % of the weight of said active material for said negative electrode.

12. The method for fabricating negative electrodes of claim 11 wherein said hydrophobic material further comprises polytetrafluoroethylene.

13. The method for fabricating negative electrodes of claim 10 wherein said hydrophobic material further comprises polytetrafluoroethylene.

14. The method for fabricating negative electrodes of claim 10 wherein the specific pore volume of said carbon black granules is between 0.45 $cm^3/g$ and 0.80 $cm^3/g$.

15. The method for fabricating negative electrodes of claim 10 wherein the specific surface area of said carbon black granules is between 200 $m^2/g$ and 1600 $m^2/g$.

16. The method for fabricating negative electrodes of claim 10 wherein the average granule diameter of said carbon black granules is between 25 μm and 50 μm.

17. A method for fabricating negative electrodes for zinc nickel secondary batteries comprising the steps of:

adding a hydrophobic material to carbon black granules in an aqueous solution, wherein said hydrophobic material is adsorbed into the carbon black granules;

stirring said aqueous solution with said carbon black granules and said hydrophobic material;

fabricating an active material with said carbon black granules in said aqueous solution and said hydrophobic material; and forming said negative electrode with said active material; and wherein said carbon black granules are between 0.2 wt. % and 5 wt. % of the weight of said active material for said negative electrode;

the specific pore volume of said carbon black granules is between 0.45 $cm^3/g$ and 0.80 $cm^3/g$;

the specific surface area of said carbon black granules is between 200 $m^2/g$ and 1600 $m^2/g$;

the average granule diameter of said carbon black granules is between 25 μm and 50 μm;

said hydrophobic material comprises butylbenzene; and said hydrophobic material is between 0.02 wt. % and 1 wt. % of the weight of said active material for said negative electrode.

* * * * *